A. H. HUMPHREY.
GAS COCK OPERATING DEVICE.
APPLICATION FILED DEC. 30, 1912.
Reissued Apr. 15, 1913. 13,552.
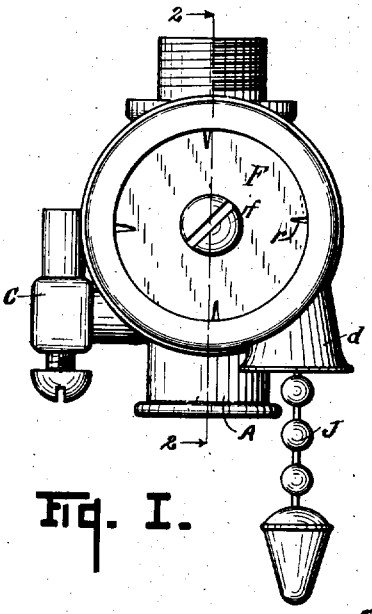
Fig. I.
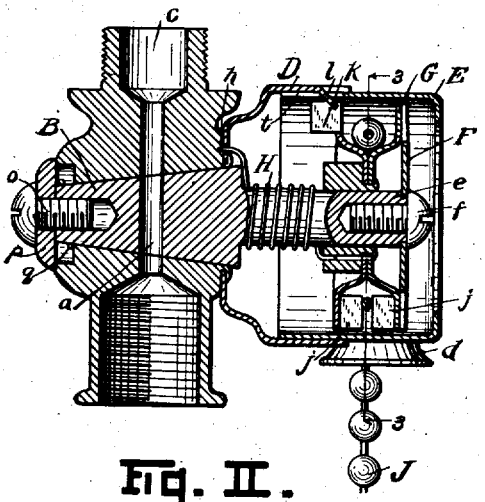
Fig. II.
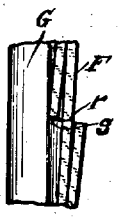
Fig. VI.
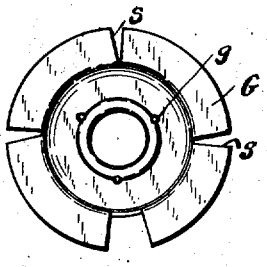
Fig. IV.
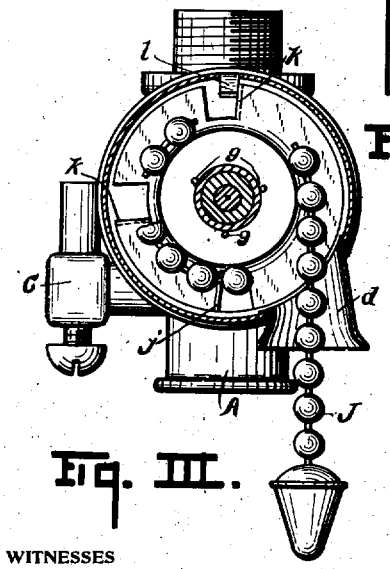
Fig. III.
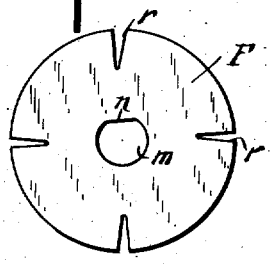
Fig. V.
WITNESSES
M. P. Woodruff
Pearl E. Lillie
INVENTOR
Alfred H. Humphrey
BY Chappell & Earl
ATTORNEYS

UNITED STATES PATENT OFFICE.

ALFRED H. HUMPHREY, OF NEW YORK, N. Y.

GAS-COCK-OPERATING DEVICE.

13,552. Specification of Reissued Letters Patent. Reissued Apr. 15, 1913.

Original No. 1,026,039, dated May 14, 1912, Serial No. 578,884. Application for reissue filed December 30, 1912. Serial No. 739,201.

*To all whom it may concern:*

Be it known that I, ALFRED H. HUMPHREY, a citizen of the United States, and a resident of the city, county, and State of New York, have invented certain new and useful Improvements in Gas-Cock-Operating Devices, of which the following is a specification.

My invention relates to that class of device in which illuminating gas may be turned on and off by the simple pulling of a depending chain or cord,—each downward pull turning the gas-cock one quarter around so that alternate pulls open and close the cock. It is preferably applied to that style of gas jets in which a pilot flame is kept constantly burning so that the gas may ignite as soon as it is turned on.

The object of my invention is to provide a simple, durable, and sightly, gas-cock operating device which will not readily get out of order and which can be easily applied and removed from the gas jet if occasion requires.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is an elevation view of a structure embodying the features of my invention. Fig. II is a vertical section on a line corresponding to line 2—2 of Fig. I. Fig. III is a vertical section on a line corresponding to line 3—3 of Fig. II. Fig. IV is a side view of the chain wheel or actuating member G. Fig. V is a side view of the ratchet disk or actuated ratchet member F. Fig. VI is a detail view of the members F and G showing their coacting relation.

In the drawing similar letters of reference indicate similar parts throughout the several views.

Referring to the drawing, A represents a fitting or cock body of usual construction provided with a tapered plug or cock B. The plug B is provided with a passage or channel *a* which allows the gas to pass from the inlet *b* to the jet opening *c* when in position shown in Fig. II. The plug or cock B is retained by means of the screw *o* arranged through the washer *p* and tapped into the end of the plug. The spring *q* holds the plug yieldingly in its seat. C is an adjustable pilot fixture of usual construction.

The ratchet disk F is fixed to the stem *e* of the cock B. The chain wheel or actuating member G is rotatably mounted upon the stem *e* to coact with the ratchet disk F. The ratchet disk F is provided with a plurality of ratchet teeth *r* formed by slitting the disk radially and laterally deflecting the portions between the slits. The member G is provided with a series of teeth *s* coacting with the ratchet teeth of the disk F and formed by slitting the edge of one of the side members of the member G and deflecting the portions or segments between the slits,—see Fig. VI—so that when the member G is rotated in one direction, the cock is turned and the member is permitted to return to its initial position without turning the cock.

The member F is provided with a central opening *m* having a squared side *n* which fits a squared shoulder on the stem *e*, the member being secured upon the shoulder by the screw *f*.

The member G is yieldingly held against the member F by the coiled spring H which surrounds the stem. One end of the spring is inserted in a hole *h* in the body A of the fixture, while the other is engaged in one of the three holes *g* of the member G. See Fig. IV. The chain J lies in the grooved periphery of the member G and is secured to the wheel by engaging between the fork *j*. This fork is formed by slitting the side members of the wheel and turning in portions thereof, as clearly shown. The spring H not only serves to hold the member G in yielding engagement with the member F, but also serves to return the member G to its initial position. The movement of the actuating member is limited by the stops *k*, *k* coacting with the stop member *l* on the casing or shell member D.

The shell member D is mounted on the body of the gas cock A while the shell member E is supported by the shell member D. These two shell members form a casing in which the cock turning devices are placed and by which they are covered and practically protected from dust and outside interference and impart a finished appearance to the structure. The shell member D is retained by shouldering the body to receive the inner end of the same and by spinning a portion of the body over its inner edge. The shell member E is telescoped with the shell member D and is, in the structure illustrated, held simply by the frictional engagement or gripping of the members, but may be otherwise interlocked or fastened if preferred. The shell member E is provided with a bell-shaped tube *d* through which the operating chain depends. The stop *e* on the casing member *d* is formed integrally therewith by slitting and striking in a portion of the shell. The casing or shell member E is provided with a slot *t* which receives this lug or stop when the parts are telescoped together, thereby properly positioning the member E and holding it against rotation in the member D.

With the parts thus arranged, they are very simple in structure and easily assembled. The chain is pulled to actuate the member G, and owing to its engagement with the ratchet member F, the cock is given a quarter turn, either opening or closing the same according to its previous position. When the chain is released, the spring H returns the member G to its initial or normal position. The plug or cock B is held with sufficient friction in its seat so that it is not returned with the actuating member, so that alternate pulls on the chain open and close the cock. The actuating member G is formed of a pair of sheet metal stampings or members mounted upon a hub, the members being provided with offset flanges forming the channel for the chain J. The ratchet teeth of the member G are formed in one of the flanges by slitting and deflecting portions thereof as stated, while the stops *k* are formed in the other member.

Having thus described my invention, what I claim as new and desire to secure by Letters Patent is:—

1. A gas-cock operating device which consists of a ratchet disk mounted on the cock stem, a chain wheel loosely mounted on the stem and provided with a ratchet coacting with said ratchet disk, and a shell adapted to cover and protect the same and supported by the gas jet body.

2. A gas-cock operating device comprising a ratchet member mounted on the cock stem, an actuating ratchet member loosely mounted on said stem and coacting with said ratchet member secured to said stem, and a shell adapted to cover and protect the same supported by the gas jet body.

3. A cock operating device comprising a ratchet member mounted on the cock stem, a chain-pull actuating member loosely mounted on the cock stem and provided with a ratchet coacting with said ratchet secured to said stem, and a shell adapted to protect the same and provided with a stop for said actuating member, supported by the cock body.

4. A gas-cock operating device consisting of suitable devices mounted upon the cock stem whereby the cock is opened and closed as desired, and an inclosing shell comprising a fixed section mounted upon the gas jet body, and a section removably mounted on the fixed section and provided with an opening through which the operating chain depends.

5. A gas-cock operating device consisting of suitable devices mounted upon the cock stem whereby the cock is opened and closed as desired, and an inclosing shell comprising a fixed section mounted upon the gas jet body, and a section removably mounted on the fixed section.

6. A gas-cock operating device consisting of suitable devices mounted upon the cock stem whereby the cock is opened and closed as desired, and an inclosing shell consisting of a stationary section mounted upon the gas jet body and a removable section having telescoping engagement with the fixed section and being supported thereby.

7. A cock operating device comprising a ratchet member fixed to the cock stem, an actuating ratchet member rotatably mounted on the cock stem to coact with the ratchet member fixed thereto, a spring arranged to hold said ratchet members yieldingly together and return said actuating member to its normal position, and an inclosing casing mounted on the cock body and provided with a stop for said actuating member.

8. A cock operating device comprising a ratchet member fixed to the cock stem, an actuating ratchet member rotatably mounted on the cock stem to coact with the ratchet member fixed thereto, a spring arranged to hold said ratchet members yieldingly together and return said actuating member to its normal position, and an inclosing casing mounted on the cock body.

9. A cock operating device comprising a ratchet member fixed to the cock stem, an actuating ratchet member rotatably mounted on the cock stem to coact with the ratchet member fixed thereto, and a spring arranged to hold said ratchet members yieldingly together and return said actuating member to its normal position.

10. A cock operating device comprising operating devices mounted upon the cock stem and comprising a chain wheel, an inclosing shell comprising a fixed section mounted upon the cock body, and a section telescoped with the fixed section and provided with an opening through which the operating chain depends, and a stop for said chain wheel formed on said fixed section, said removoble section being slotted to receive said stop, whereby the parts are positioned and rotation of the removable section prevented.

11. In a structure of the class described, the combination with the cock body, of a rotary cock provided with a projecting stem, a ratchet disk secured to said stem, a chain wheel provided with a ratchet rotatably mounted on said stem at the side of said disk to coact therewith, a coiled spring arranged on said stem, one end of said spring being secured to said wheel and the other to a relatively fixed member whereby the ratchets are retained in coöperative relation and said chain wheel returned to its initial position, and stops for limiting the movement of said chain wheel.

12. In a structure of the class described, the combination with the cock body, of a rotary cock provided with a projecting stem, a ratchet secured to said valve stem, a chain wheel provided with a ratchet rotatably mounted on said stem to coact with said ratchet secured thereto, a return spring for said chain wheel, a casing mounted on said valve casing to inclose said stem and the parts mounted thereon and provided with an opening through which the chain depends, and a stop on said casing for said chain wheel.

13. A cock operating device comprising a disk-like ratchet member fixed to the stem, the teeth of the ratchet being formed by slitting the disk and deflecting portions thereof laterally, and a chain operated actuating wheel consisting of a pair of sheet metal members secured together and having offset flanges coacting to provide a chain channel, the flange of one of the members being provided with ratchet teeth coacting with said ratchet disk, the teeth being formed by slitting the flange of the member and laterally deflecting portions thereof, the other member of the wheel being provided with stops formed by slitting its flange and deflecting portions thereof, portions of said flanges of said members being turned into the channel to coact to provide a chain engaging fork.

14. A cock operating device comprising a disk-like ratchet member fixed to the stem, the teeth of the ratchet being formed by slitting the disk and deflecting portions thereof laterally, and a chain actuating wheel consisting of a pair of sheet metal members secured together and having offset flanges coacting to provide a chain channel, the flange of one of the members being provided with ratchet teeth coacting with said ratchet disk, the teeth being formed by slitting the flange of the member and laterally offsetting portions thereof, the other member of the wheel being provided with stops.

15. A cock operating device comprising a disk-like ratchet member fixed to the stem, the teeth of the ratchet being formed by slitting the disk and deflecting portions thereof laterally, and a chain operated actuating wheel consisting of a pair of sheet metal members secured together and having offset flanges coacting to provide a chain channel, the flange of one of the members being provided with ratchet teeth coacting with said ratchet disk, the teeth being formed by slitting the flange of the member and laterally offsetting portions thereof, portions of said flanges of said members being turned into the channel to coact to provide a chain engaging fork.

16. A cock operating device comprising a disk-like ratchet member fixed to the stem, the teeth of the ratchet being formed by slitting the disk and deflecting portions thereof laterally, and a chain operated actuating wheel consisting of a pair of sheet metal members secured together and having offset flanges coacting to provide a chain channel, the flanges of one of the members being provided with ratchet teeth coacting with said ratchet disk, the teeth being formed by slitting the flange of the member and laterally offsetting portions thereof.

In witness whereof, I have hereunto set my hand in the presence of two witnesses.

ALFRED H. HUMPHREY.

Witnesses:
J. P. Conroy,
F. E. Jordan.